United States Patent
Yoshida et al.

(10) Patent No.: US 8,330,909 B2
(45) Date of Patent: Dec. 11, 2012

(54) LIQUID CRYSTAL DISPLAY DEVICE AND ELECTRONIC DEVICE

(75) Inventors: Keisuke Yoshida, Osaka (JP); Kazuhiro Maeda, Osaka (JP); Ryohji Yayotani, Osaka (JP); Mutsumi Nakajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 432 days.

(21) Appl. No.: 12/601,887

(22) PCT Filed: Aug. 28, 2008

(86) PCT No.: PCT/JP2008/065447
§ 371 (c)(1),
(2), (4) Date: Nov. 25, 2009

(87) PCT Pub. No.: WO2009/028624
PCT Pub. Date: Mar. 5, 2009

(65) Prior Publication Data
US 2010/0165267 A1    Jul. 1, 2010

(30) Foreign Application Priority Data
Aug. 31, 2007   (JP) ................................. 2007-226655

(51) Int. Cl.
*G02F 1/1335*   (2006.01)
*G02F 1/1333*   (2006.01)
(52) U.S. Cl. ..................... 349/114; 349/106; 349/110
(58) Field of Classification Search .................. 349/106, 349/110–114, 116
See application file for complete search history.

(56) References Cited

U.S. PATENT DOCUMENTS

| | | | |
|---|---|---|---|
| 6,215,538 B1 * | 4/2001 | Narutaki et al. | 349/106 |
| 7,242,449 B1 | 7/2007 | Yamazaki et al. | |
| 2003/0122998 A1 | 7/2003 | Iijima | |
| 2004/0246424 A1 | 12/2004 | Sawasaki et al. | |
| 2005/0052435 A1 | 3/2005 | Cho et al. | |
| 2006/0017871 A1 | 1/2006 | Morimoto et al. | |
| 2006/0103794 A1 | 5/2006 | Iijima | |
| 2006/0197006 A1 * | 9/2006 | Kochi | 250/208.1 |
| 2006/0262055 A1 | 11/2006 | Takahara | |
| 2007/0268206 A1 * | 11/2007 | Kinoshita et al. | 345/30 |
| 2008/0122792 A1 * | 5/2008 | Izadi et al. | 345/173 |

(Continued)

FOREIGN PATENT DOCUMENTS

JP     2006-251636 A     9/2006

(Continued)

OTHER PUBLICATIONS

International Search Report for PCT/JP2008/065447, mailed Oct. 14, 2008.

*Primary Examiner* — Huyen Ngo
(74) *Attorney, Agent, or Firm* — Nixon & Vanderhye P.C.

(57) ABSTRACT

A liquid crystal display device (1) includes (i) an opening (22a) which is provided on a color filter (22) in a transmissive region and (ii) a light sensor (14) which is provided in the transmissive region for detecting an intensity of light which enters the liquid crystal display device (1), the light directly entering the light sensor (14) through the opening (22a). This makes it possible to provide (1) a liquid crystal display device in which each dot region includes a light detection element and which prevents a decrease in aperture ratio of a transmissive region and (ii) an electronic device.

11 Claims, 7 Drawing Sheets

U.S. PATENT DOCUMENTS

2008/0191979 A1    8/2008   Nakane
2008/0273150 A1   11/2008   Iijima

FOREIGN PATENT DOCUMENTS

| | | |
|---|---|---|
| JP | 2006-330578 | 12/2006 |
| JP | 2007-052105 | 3/2007 |
| JP | 2007-65239 | 3/2007 |
| JP | 2007-65239 A | 3/2007 |
| JP | 2007-206625 | 8/2007 |
| WO | 2006/088118 A1 | 8/2006 |

* cited by examiner

LIQUID CRYSTAL DISPLAY DEVICE AND ELECTRONIC DEVICE

This application is the U.S. national phase of International Application No. PCT/JP2008/065447, filed 28 Aug. 2008, which designated the U.S. and claims priority to Japanese Patent Application No. 2007-226655, filed 31 Aug. 2007, the entire contents of each of which are hereby incorporated by reference.

TECHNICAL FIELD

The present invention relates to a liquid crystal display device including a light sensor element, and to an electronic device.

BACKGROUND ART

A liquid crystal display device has been developed from various aspects so as to respond to demands for higher function and lower power consumption. For example, a liquid crystal display device has been developed in which (i) a region (reflective region) where a reflective film is provided and (ii) a region (transmissive region) where no reflective film is provided are provided in a dot of each pixel and which is capable of switching modes of displaying an image, a moving picture, or the like. Such a liquid crystal display device includes an upper substrate and a lower substrate. A color filter is provided on the upper substrate or the lower substrate. Furthermore, a light source such as a backlight is provided on the lower substrate's side.

In a bright place, the liquid crystal display device employs a reflective mode in which the reflective region is used. The reflective mode is such that: external light which enters the liquid crystal display device from above the upper substrate is reflected in the reflective region and the light thus reflected is emitted toward the upper substrate, thereby an image, a moving picture, or the like is displayed on a display screen of the liquid crystal display device. On the other hand, in a dark place, the liquid crystal display device employs a transmissive mode in which the transmissive region is used. The transmissive mode is such that: light which is emitted from the backlight and enters the liquid crystal display device from above the lower substrate is transmitted through the transmissive region, and the light thus transmitted is emitted toward the upper substrate, thereby an image, a moving picture, or the like is displayed on the display screen of the liquid crystal display device. This allows the backlight to consume lower power since the liquid crystal display device uses the light emitted from the backlight only in a dark place.

However, in the reflective mode, the light emitted from the liquid crystal display device is transmitted through the color filter two times. This is because the external light which enters the liquid crystal display device from above the upper substrate is reflected in the reflective region and the light thus reflected is emitted toward the upper substrate. On the other hand, in the transmissive mode, the light emitted from the liquid crystal display device is transmitted through the color filter one time. This is because the light which is emitted from the backlight and enters the liquid crystal display device from above the lower substrate is transmitted through the transmissive region, and the light thus transmitted is emitted toward the upper substrate. For this reason, there occurs difference in color density between the light emitted from the reflective region and, the light emitted from the transmissive region in a case where the reflective region and the transmissive region are made of an identical resist material.

In order to deal with this problem, Patent Literature 1 discloses a liquid crystal display device in which a non-colored region is provided in a color filter in a reflective region.

According to the liquid crystal display device disclosed in Patent Literature 1, light which is obtained in a reflective mode by being transmitted through the color filter two times is light in which (i) uncolored light which is transmitted through the non-colored region and (ii) colored light which is transmitted through a colored region are superposed. On the other hand, light which is obtained in a transmissive mode by being emitted from a backlight, thereafter being transmitted through the color filter one time is all transmitted through the colored region and becomes colored light. As described earlier, it is possible to close a difference in color density between the light which is obtained in the reflective mode by being transmitted through the color filter two times and the light which is obtained in the transmissive mode by being transmitted through the color filter one time. Accordingly, the liquid crystal display device disclosed in Patent Literature 1 allows an obtainment of a display with high visibility.

In recent years, a liquid crystal display device has also been developed which includes a light sensor element provided in each pixel so as to have an optical input function. The liquid crystal display device with the optical input function is capable of carrying out image pickup operation and control operation in addition to display operation. Specifically, it is possible to realize a liquid crystal display device which has a touch panel function, a scanner function, a camera function, or a fingerprint sensor function. According to the liquid crystal display device, it is also possible to determine that it is dark around the liquid crystal display device and to activate a backlight in a case where the light sensor element receives a small amount of light.

Patent Literature 2 discloses a liquid crystal display device which includes: (i) a light sensor element provided in a reflective display section in which a reflective electrode is provided and (ii) an opening provided in a region which corresponds to the light sensor element in a color filter. According to the liquid crystal display device disclosed in Patent Literature 2, light which enters the light sensor element passes through the opening. Namely, the light which enters the light sensor element is not absorbed in the color filter, and it is therefore possible to provide a liquid crystal display device in which a decrease in sensitivity of the light sensor element is prevented.

This is explained below with reference to FIGS. 6 and 7.

FIG. 6 is a plan view of a pixel including a transmissive region and a reflective region, the pixel including a light sensor element provided in the reflective region. FIG. 7 is a cross-sectional view taken along the line B-B' of FIG. 6.

A picture element 103 is constituted by (i) a pixel 103R in which a red color filter is provided, (ii) a pixel 103G in which a green color filter is provided, and (iii) a pixel 103B in which a blue color filter is provided (see FIG. 6). The pixel 103R, the pixel 103G, and the pixel 103B include respective transmissive regions and respective reflective regions. The respective reflective regions include respective openings 122b. Furthermore, the respective openings 122b include respective light sensor elements 114.

The picture element 103 includes a first substrate 111 and a second substrate 121 which are provided so as to face each other via a liquid crystal layer 117 (see FIG. 7). A light blocking film 112 is locally provided on the first substrate 111 in the reflective region so that the blocking film 112 positionally corresponds to a light sensor element 114. Moreover, an insulating film 113 is provided on the first substrate 111 so that the insulating film 113 covers the light blocking film 112. Further, the light sensor element 114 is provided right above the light blocking film 112 via the insulating film 113. Furthermore, an insulating film 115 is provided so as to cover the light sensor element 114, and a reflective electrode 116 is provided on the insulating film 115. In the reflective electrode 116, an opening region is provided right above the light sensor element 114.

Moreover, a color filter 122 is provided on the second substrate 121 facing the first substrate 111. An opening 122b is provided on the color filter 122 in the reflective region. The opening 122b is provided so as to face the light sensor element 114. Further, a transparent resin 123 for forming a multi gap is provided so as to cover the opening 122b.

According to such an arrangement, the reflective electrode 116 reflects light reaching thereto via the second substrate 121, the color filter 122 and the liquid crystal layer 117, thereby display is carried out in the reflective mode. On the other hand, light which enters the light sensor element 114 from the second substrate 121 passes through the opening 122b. This prevents reduction in light intensity due to the color filter 122, and it is therefore possible to prevent a decrease in sensitivity of the light sensor element 114.

However, Patent Literature 2 includes the light sensor element 114 provided in the reflective region, and it is therefore necessary to secure a region in the reflective region in which region the light sensor element 114 is to be provided. For this reason, an area of the transmissive region becomes small since an area of the reflective region becomes large. This causes a problem of a decrease in aperture ratio of the transmissive region.

On the other hand, it may be an option to provide a light sensor element in the transmissive region. However, light which enters from outside enters the light sensor element through the color filter in this case. This causes a decrease in light receiving sensitivity of the light sensor element, as explained earlier. For this reason, it is necessary to increase an area of the light sensor element so as to increase a light receiving sensitivity of the light sensor element. This causes a problem of a decrease in aperture ratio of the transmissive region.

CITATION LIST

Patent Literature 1

Japanese Patent Application Publication, Tokukai, No. 2003-177397 A (Publication Date: Jun. 27, 2003)

Patent Literature 2

Japanese Patent Application Publication, Tokukai, No. 2006-330578 A (Publication Date: Dec. 7, 2006)

SUMMARY OF INVENTION

The present invention has been made in view of the problems, and an object of the present invention is to provide (i) a liquid crystal display device which includes a light detection element and which prevents a decrease in aperture ratio of a transmissive region and (ii) an electronic device.

In order to solve the problems, a liquid crystal display device in accordance with the present invention includes: dot regions in each of which a color filter layer is provided; and a transmissive region included in each of the dot regions, for causing information to be displayed by causing light emitted from a light source to be transmitted through the transmissive region, the liquid crystal display device including: a first region provided on the color filter layer in the transmissive region, the first region being a region whose transmittance is higher than a transmittance of a color layer; and a light detection element provided in the transmissive region, for detecting an intensity of light which enters the light detection element, the light directly entering the light detection element through the first region.

According to the arrangement, external light emitted toward the liquid crystal display device directly enters the light detection element through the first region. Namely, the light which enters the light detection element directly enters the light detection element without being transmitted through the color filter layer. This makes it possible to avoid a situation where the light which enters the light detection element decreases in intensity by being transmitted through the color filter. That is, it is possible to prevent a decrease in light receiving sensitivity of the light detection element. Therefore, it is possible to cause an area of the light detection element to be smaller in the case where the first region is provided on the color filter layer than in a case where no first region is provided on the color filter layer. This realizes a liquid crystal display device which includes a light detection element and which prevents a decrease in aperture ratio of a transmissive region.

Here, it is desirable that the first region which is the region whose transmittance is higher than a transmittance of the color layer be transmissive for light of a wavelength range from 400 nm to 700 nm, with a transmittance of preferably not less than 80% and more preferably not less than 90% throughout the first region.

As described earlier, a higher transmittance of the first region allows a further reduction in an area of the light detection element. Moreover, a transmittance of the first region varies relative to a given visible light wavelength. In a case where the first region is colored, the coloring is superposed on a reflective display and a color of the reflective display is spoiled. For this reason, it is desirable that the first region be transmissive for light of the wavelength range from 400 nm to 700 nm which is a visible light wavelength range, with a generally high transmittance.

External light emitted toward a liquid crystal display device at least includes (i) ambient light obtained in an environment in which the liquid crystal display device is provided (i.e., sunlight, illuminating light, and the like) and (ii) light emitted from a light source which is built in the liquid crystal display device, the light being reflected in a document which is provided near a color filter layer and whose information is to be scanned.

REFERENCE SIGNS LIST

Figure 1:
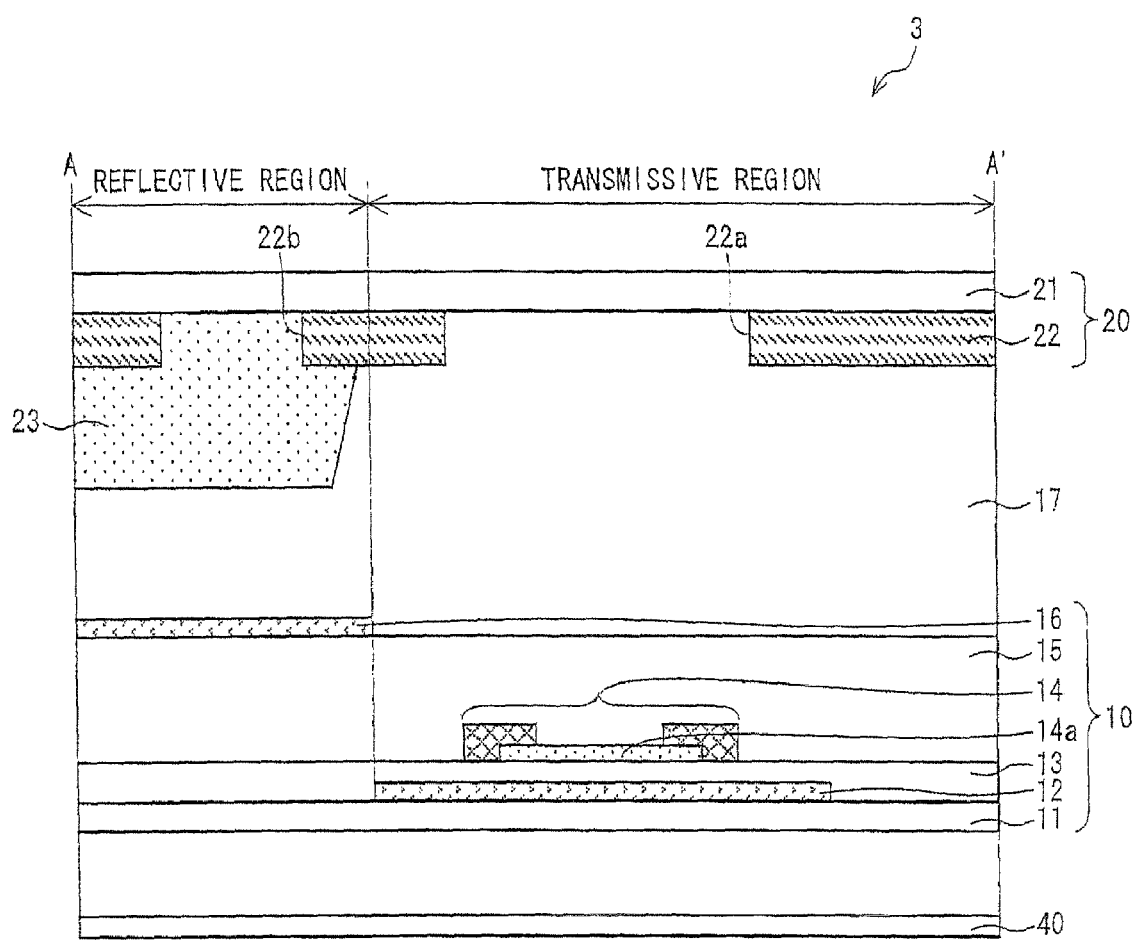
FIG. 1, which illustrates an arrangement of a feature of a liquid crystal display device in accordance with an embodiment of the present invention, is a cross-sectional view taken along the line A-A' of FIG. 2.

1 Liquid crystal display device
2 Display screen (Display region)
3 Picture element (Dot region)
3B Pixel
3G Pixel
3R Pixel
4 Pixel element (Dot region)
10 First substrate
12 Light blocking layer
14 Light sensor (Light detection element)
14a Light receiving section
15 Organic insulating film
16 Reflective electrode (Reflective plate)
18 First substrate
20 Second substrate
22 Color filter (Color filter layer)
22a Opening (First region, Non-colored region)
22b Opening (Second region, Another non-colored region)
25 Second substrate
30 Picture element (Dot region)
30G Pixel
30R Pixel
40 Backlight (Light source)

DESCRIPTION OF EMBODIMENTS

An embodiment of the present invention is described below with reference to FIGS. 1 through 4.

[Arrangement of Liquid Crystal Display Device]

First, a schematic arrangement of a liquid crystal display device 1 is described below with reference to FIGS. 1 through 3.

Figure 3:
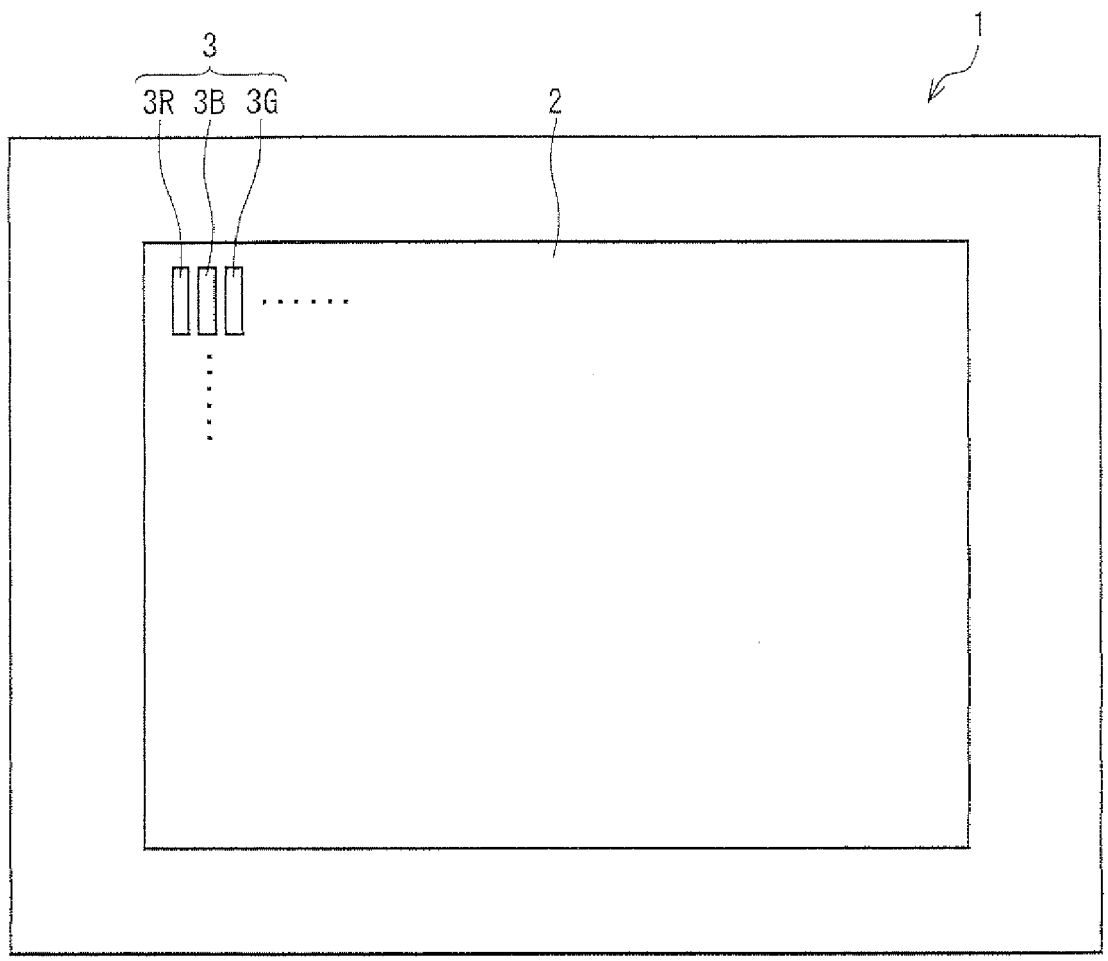
FIG. 3 is a plan view illustrating the arrangement of the feature of the liquid crystal display device.

FIG. 3 is a plan view schematically illustrating the liquid crystal display device 1 in accordance with an embodiment of the present invention.

The liquid crystal display device 1 includes a display screen 2 on which a still image, a moving picture, a letter, or the like (hereinafter abbreviated as an "image" or the like) is displayed (see FIG. 3). The display screen 2 includes a plurality of picture elements (dot regions) 3 which are provided in a matrix pattern. Each of the plurality of picture elements 3 includes a plurality of pixels (subpixels). For example, the plurality of pixels are: (i) a pixel 3R in which a red color filter is provided, (ii) a pixel 3B in which a blue color filter is provided, and (iii) a pixel 3G in which a green color filter is provided. Namely, the pixels 3R, the pixels 313, and the pixels 3G are provided in a matrix pattern on the entire display screen 2. Note that a color filter is described later.

Figure 2:
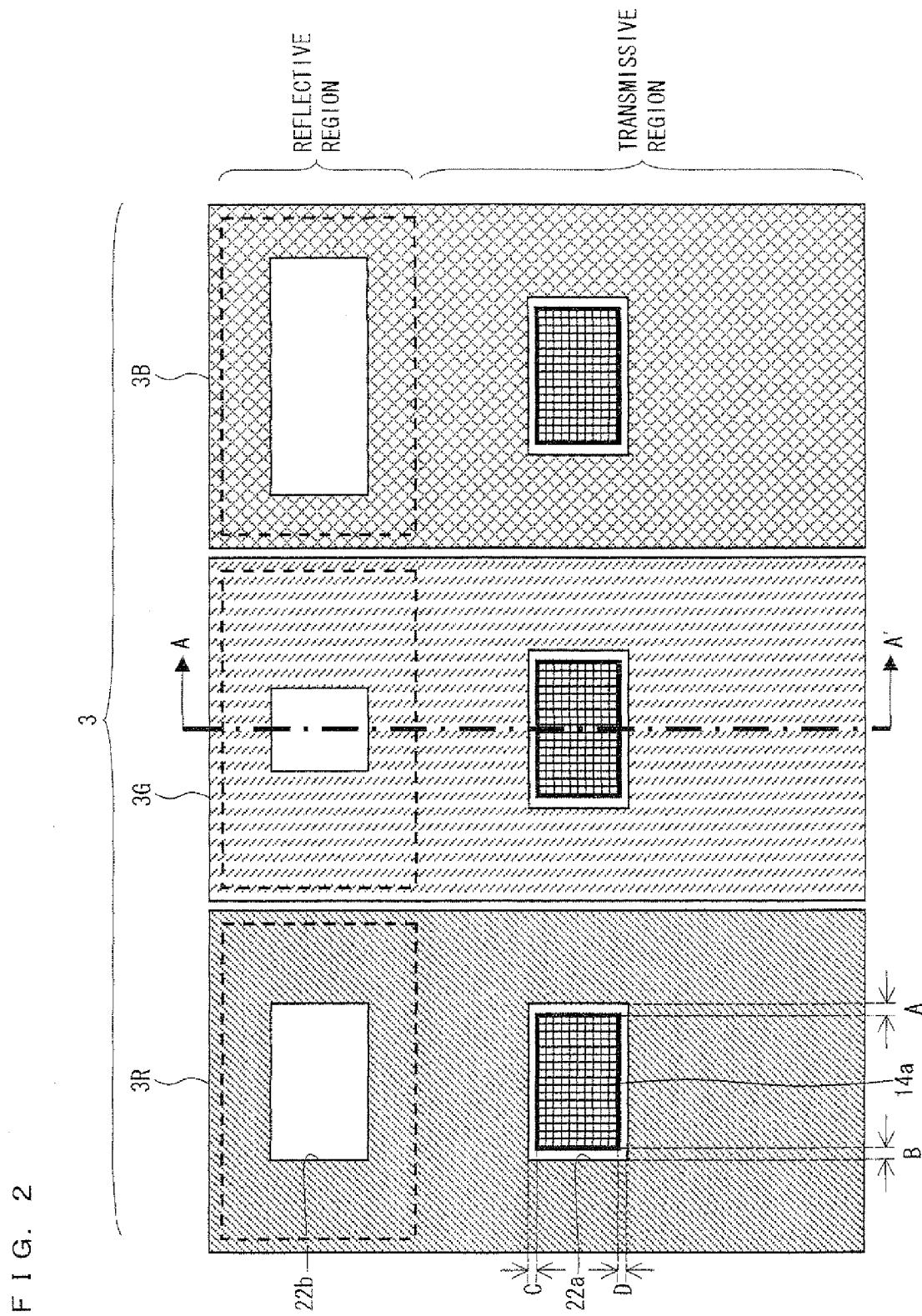
FIG. 2 is a plan view illustrating an arrangement of a feature of a picture element of the liquid crystal display device.

FIG. 2 is a plan view schematically illustrating a picture element 3 on the display screen 2 of the liquid crystal display device 1 illustrated in FIG. 3.

The pixel 3R, the pixel 3B, and the pixel 3G of the picture element 3 include respective reflective regions and respective transmissive regions (see FIG. 2). The respective transmissive regions of the pixel 3R, the pixel 3B, and the pixel 3G have respective openings 22a. An opening (a first region, a non-colored region) 22a is a region whose transmittance is higher than a transmittance of a color layer. On the other hand, the respective reflective regions of the pixel 3R, the pixel 3B, and the pixel 3G have respective openings 22b. An opening 22b (a second region, another uncolored region) is another region whose transmittance is higher than a transmittance of a color layer. Further, the respective openings 22a include respective light receiving sections 14a of respective light sensors (light detection elements) (described later).

FIG. 1 is a cross-sectional view taken along the line A-A' of FIG. 2.

A picture element 3 includes (i) a first substrate 10 and (ii) a second substrate 20 in which a color filter 22 is provided. The first substrate 10 and the second substrate 20 are provided so as to face each other via a liquid crystal layer 17 (see FIG. 1). Furthermore, a reflective region of the picture element 3 includes a reflective electrode 16. Namely, note that a region in which the reflective electrode is provided is referred to as the reflective region in the picture element 3. Note also that a region in which no reflective electrode 16 is provided is referred to as a transmissive region in the picture element 3. Moreover, a backlight 40 is provided as a light source below the first substrate 10 (on a side of the first substrate 10 which side is opposite to a side on which the second substrate is provided).

Note here that the reflective region is a region which is used when the liquid crystal display device 1 displays an image or the like in a reflective mode. The reflective mode is a display mode in which the display screen 2 (see FIG. 3) displays an image or the like by using light which enters the liquid crystal display device 1 from around the liquid crystal display device 1 and then is reflected from the reflective electrode 16 whereby the light thus reflected passes through the liquid crystal layer 17 twice.

Moreover, the transmissive region is a region which is used when the liquid crystal display device 1 displays an image or the like in a transmissive mode. The transmissive mode is a display mode in which the display screen 2 (see FIG. 3) displays an image or the like by using light transmitted through the transmissive region after being emitted from the light source (i.e. backlight 40) which is built in the liquid crystal display device 1.

An opening 22a is provided on the color filter 22. A light sensor (light detection element) 14 including a photodiode is provided on the first substrate 10 in the transmissive region. The light sensor 14 includes a light receiving section 14a for receiving light which enters the light receiving section 14a. The light receiving section 14a is provided on the first substrate 10 so as to face the opening 22a. The light sensor 14 detects the light which enters the light receiving section 14a, detects an intensity of the light received by the light receiving section 14a, and supplies the intensity thus detected as an electric signal.

Polarizing plates (not illustrated) are provided in a bottom surface of the first substrate 10 and an upper surface of the second substrate 20, respectively and a switching element such as a TFT is provided in the reflective region. Meanwhile, the liquid crystal display device 1 may have a structure of "CF on Array" (described later in more details) in which the color filter 22 is provided on the first substrate 10. However, as described in the present embodiment, it is possible to separately form the light sensor 14 and the color filter 22 in the liquid crystal display device 1 by providing the light sensor 14 and the color filter 22 on the first substrate 10 and the second substrate 20, respectively. This allows a reduction in time required for producing the liquid crystal display device 1.

[Transmissive Region]

The following explains a specific arrangement and an advantage of the transmissive region in the picture element 3 of the liquid crystal display device 1 in accordance with the present embodiment.

The first substrate includes 10 a light blocking layer 12 (described later) which is locally provided on a substrate 11 so as to correspond to the light sensor 14 (see FIG. 1). Furthermore, an insulating film 13 is provided so as to cover the light blocking layer 12. Moreover, the light sensor 14 is provided above the light blocking layer 12 via the insulating film 13. Further, an organic insulating film 15 is provided so as to cover the light sensor 14. Furthermore, a transparent electrode (not illustrated) made of an ITO is provided on the organic insulating film 15.

Moreover, the second substrate 20 in the transmissive region includes the color filter 22 which is provided under a substrate 21 (so as to face the first substrate 10), and the opening 22a is provided on the color filter 22. The opening 22a is provided so as to face the light receiving section 14a of the light sensor 14.

By the opening 22a on the color filter 22 so as to face the light receiving section 14a of the light sensor 14 as described in the present embodiment, external light entering from above the second substrate 20 is received by the light receiving section 14a through the opening 22a. Namely, the external light which enters from above the second substrate directly enters the light sensor 14 without passing through the color filter 22. As a result, an intensity of light which enters the light sensor 14 will not be decreased due to the color filter 22. Namely, it is possible to prevent a decrease in light receiving sensitivity of the light sensor 14.

Accordingly, an area of the light sensor 14 can be smaller in the case where the opening 22a is provided than in a case where no opening 22a is provided. This realizes a bright liquid crystal display device which is high in aperture ratio of a transmissive region.

For example, in a case where the light sensor 14 is provided in the reflective region, it is necessary to increase an area of the reflective region. On the other hand, providing the light sensor 14 in the transmissive region as described in the present embodiment eliminates the need of excessively increasing an area of the reflective region. Therefore, the aperture ratio of the transmissive region can be higher in this case than in the case where the light sensor 14 is provided in the reflective region.

The aperture ratio of the reflective region and a total aperture ratio of the reflective region and the transmissive region are lower in the case where the light sensor 14 is provided in the transmissive region than in the case where the light sensor 14 is provided in the reflective region. However, providing the light sensor 14 in the transmissive region allows an increase in aperture ratio of the transmissive region, and it is therefore possible to cause a liquid crystal display device 1 to have a wider sphere of practical use.

Furthermore, the light sensor 14 includes a plurality of circuit elements (not illustrated) such as a diode, a transistor, a capacitor, and the like. The plurality of circuit elements have respective gaps therebetween. This allows light to be transmitted through the respective gaps provided between the plurality of circuit elements such as a diode, a transistor, a capacitor, and the like. For this reason, providing the light sensor 14 in the transmissive region causes light emitted from the backlight 40 to be transmitted through the respective gaps. Therefore, it is possible to further prevent a decrease in aperture ratio of the transmissive region in the case where the light sensor 14 is provided in the transmissive region than in the case where the light sensor 14 is provided in the reflective region.

For example, in the case where the light sensor 14 is provided in the reflective region, the reflective region becomes larger in area than in a case where no light sensor 14 is provided in the picture element 3. This is because it is necessary to secure, in the picture element 3, a reflective region whose area is large enough to allocate at least the light sensor 14 therein. Moreover, in a case where a TFT is provided in the reflective region, a gap is made between the light sensor 14 and the TFT. For this reason, it is necessary to secure a reflective region whose area is large enough to allocate therein at least the gap thus made and the light sensor 14. This causes the reflective region to be larger. As a result, the transmissive region becomes smaller. This causes a loss in aperture ratio of the transmissive region.

On the other hand, in the case where the light sensor 14 is provided in the transmissive region, an aperture ratio of the transmissive region is reduced as much as an area which is occupied by the light sensor 14 exclusive of the respective gaps, as compared with the case where no light sensor 14 is provided in the picture element 3. This is because the respective gaps between the plurality of circuit elements which are included in the light sensor 14 contribute as the transmissive region.

Accordingly, it is possible to further prevent a decrease in aperture ratio of the transmissive region in the case where the light sensor 14 is provided in the transmissive region than in the case where the light sensor 14 is provided in the reflective region.

Note here that respective colors of red light, blue light, and green light are balanced in the transmissive region in accordance with resist materials selected for respective color filters. Accordingly, it is unnecessary to adjust the area of the opening 22a by colors for adjusting the color balance, unlike the case where the opening is provided in the reflective region.

Note that it is preferable to provide the opening 22a and the light receiving section 14a such that: each of A, B, C, and D is not less than 3 μm where A is a length from a right side of the opening 22a to a right side of the light receiving section 14a, B is a length from a left side of the opening 22a to a left side of the light receiving section 14a, C is a length from an upper side of the opening 22a to an upper side of the light receiving section 14a, and D is a length from a lower side of the opening 22a to a lower side of the light receiving section 14a. (see FIG. 2). This makes sure that the opening 22a and the light receiving section 14a are provided to face each other, by taking into consideration variations caused when the first substrate 10 (refer to FIG. 1) and the second substrate 20 (refer to FIG. 1) are combined together. Note, in an arrangement of CF on Array (specifically described later), that variations in mask alignment is the issue which are caused during exposure in photolithography for forming the opening, not the variations caused when the first substrate and the second substrate are combined together.

The first substrate 10 includes the light blocking layer 12 (see FIG. 1) which is provided between the light sensor 14 and the backlight 40 so as to block the light emitted from the backlight 40.

Note here that providing an opening in a transmissive region causes the following problem.

Providing an opening in a color filter causes the color filter to be unleveled. Such unleveled color filter may disturb alignment of liquid crystal molecules, and it is feared that a contrast will decrease when the disturbance in the alignment of liquid crystal molecules is visible. Note that though it is possible to level the color filter off more by providing, in the opening, a leveling transparent resin such as an overcoat, an addition of such a production process causes (i) a decrease in yield, (ii) an increase in production and material costs, and (iii) a decrease in transmittance of the transmissive region.

Also in a case where the color filter has a multi-gap structure, it is necessary to carry out coating two times (separately) for (i) a transparent resin for creating the multi-gap structure and (ii) the leveling transparent resin for the leveling-off. This similarly adds an extra production process.

Note however that the present embodiment is arranged such that the light blocking layer 12 is provided between the light sensor 14 and the backlight 40 so as to face the opening 22b via the light sensor 14. For this reason, the light emitted from the backlight 40 can be blocked so as not to be transmitted through a region of the liquid crystal layer 17 in which region the alignment of liquid crystal molecules is disturbed. This prevents the alignment of liquid crystal molecules from being visibly disturbed due to the opening 22a provided on the color filter 22. It is therefore possible to prevent a decrease in contrast.

Furthermore, it is possible to prevent the light emitted from the backlight 40 from entering the light sensor 14. Namely, it is possible to prevent the light sensor 14 from sensing the light emitted from the backlight 40, and it is therefore possible to cause the light sensor 14 to accurately function. Moreover, it is unnecessary to form a transparent resin for leveling the opening 22a off.

[Reflective Region]

The following explains a specific arrangement and an advantage of the reflective region in the picture element 3 of the liquid crystal display device 1 in accordance with the present embodiment.

The first substrate 10 in the reflective region of the picture element 3 includes the insulating film 13 and the organic insulating film 15 which are provided on the substrate 11 in this order, and the reflective electrode 16 which is provided on the organic insulating film 15 (see FIG. 1). The reflective electrode 16, which is made of aluminum or the like, reflects light which enters the reflective electrode 16. Furthermore, in the reflective region of the first substrate 10, a switching element such as a TFT and an auxiliary capacitor and the like (which are not illustrated) are provided between the insulating film 13 and the organic insulating film 15.

The second substrate 20 in the reflective region includes the color filter 22 provided under the substrate 21 (on a surface of the substrate 21 which surface faces the first substrate 10), and the opening 22b (second region) provided on the color filter 22. Moreover, the present embodiment is arranged such that a transparent resin 23 for forming a multi gap is provided under the color filter 22.

When light emitted around the picture element 3 enters the reflective region from above the second substrate 20, the light which enters the reflective region is transmitted through the color filter 22, reflected in the reflective electrode 16, transmitted through the color filter 22 again, thereafter being emitted outside the liquid crystal display device 1. Namely, it follows that the light which enters the reflective region passes through the color filter 22 two times. For this reason, in a case where an identical resist material is used for a transmissive region and a reflective region so as to form a color filter, a color of the light emitted from the reflective region is generally deeper than a color of light emitted from the transmissive region.

On the other hand, providing the opening 22b on the color filter 22 in the reflective region as described in the present embodiment causes (i) part of the light which enters the reflective region and (ii) part of the light which is reflected in the reflective electrode 16, thereafter being emitted from the reflective region to pass through the opening 22b. Therefore, it is possible to cause a color of the light emitted from the reflective region to be lighter in the case where the opening 22b is provided on the color filter 22 in the reflective region than in a case where no opening 22b is provided on the color filter 22 in the reflective region.

This allows a color of the light emitted from the reflective region to be close to a color of the light emitted from the transmissive region even in the case where an identical resist material is used for the transmissive region and the reflective region. Further, providing the opening 22b allows an increase in reflectance of the light which is reflected in the reflective electrode 16.

As explained earlier, according to the present embodiment, it is possible to provide a liquid crystal display device 1 which includes at least a transmissive region out of the transmissive region and a reflective region so as to display information in a transmissive mode, the liquid crystal display device 1 including the light sensor 14 provided in the transmissive region of each of the picture elements 3.

It is possible to cause the light sensor 14 in accordance with the arrangement to function as means for obtaining coordinate information on the display screen 2. For example, the light sensor 14 is capable of detecting that an operator brings a finger or a stylus close to somewhere on the display screen 2. Furthermore, when a document whose information is to be scanned is put on the display screen 2 and light emitted from the backlight 40 is directed toward the document, it is possible to scan information of the document and to display the scanned information on the display screen by detection of light reflected in the document by the light sensor 14.

Moreover, the liquid crystal display device 1 in accordance with the present embodiment includes the light sensor 14 provided in each of the pixel 3R, the pixel 3B, and the pixel 3G. Namely, the display screen 2 of the liquid crystal display device 1 includes (i) the pixels and (ii) the light sensors 14 which are identical to the pixels in number. For this reason, the light sensors 14 are provided in the display screen 2 with high density.

For this reason, in a case where the light sensor 14 is used as means for obtaining coordinate information on the display screen 2, coordinate information to be detected is high in resolution. This makes it possible to perform on the display screen 2 an accurate determination of coordinates of light which enters the display screen 2.

For example, in a case where the display screen 2 is touched with a stylus or a fingertip, the light sensor 14 provided near a touched part of the display screen 2 detects a change in light intensity. This allows an accurate determination of coordinates of that part on the display screen 2 which is touched with a stylus or a fingertip.

The light sensors 14 provided in a single picture element 3 are greater in number in the case where the light sensor 14 is provided in each of the pixel 3R, the pixel 38, and the pixel 3G than in a case where the light sensor 14 is provided in any one of the pixel 3R, the pixel 3B, and the pixel 3G. This allows an increase in light detection sensitivity relative to a single picture element 3.

As described earlier, in the case where the light sensor 14 is provided in each of the pixel 3R, the pixel 3B, and the pixel 3G, coordinates which determine a position of the light which enters the display screen 2 are high in resolution, and it is therefore possible to realize a liquid crystal display device 1 whose detection sensitivity is high.

Note that the light sensor 14 is provided so as to correspond to the opening 22a provided on the color filter 22 in the transmissive region as described earlier. This prevents a decrease in aperture ratio of the transmissive region. Accordingly, it is possible to provide a liquid crystal display device 1 which is capable of brightly displaying information in the transmissive mode and which has a touch panel function, or a liquid crystal display device 1 which is capable of brightly displaying information in the transmissive mode and which has a scanner function. Furthermore, it is preferable to use the liquid crystal display device 1 for a liquid crystal display device which has a camera function and a fingerprint sensor function. Moreover, it is possible to add, to the liquid crystal display device 1, a function of displaying information in the reflective mode by providing the reflective region in each of the picture elements 3 as described in the present embodiment. As described earlier, it is possible to preferably use the liquid crystal display device 1 particularly for a liquid crystal display device which has a function in which coordinates on the display screen 2 are required to be determined.

Further, in a case where an intensity of light which enters the light sensor 14 is low, it is possible for the liquid crystal display device 1 to determine that it is dark around the liquid crystal display device 1, thereby turning on the backlight 40 or adjusting the intensity of the light. Namely, it is possible to control switching of the transmissive mode and the reflective mode in accordance with an output from the light sensor 14. For example, in a case where an output from the light sensor 14 is high and it is detected that it is bright around the liquid crystal display device 1, it is possible for the liquid crystal display device 1 to turn off the backlight 40 and to display information in the reflective mode. On the contrary, in a case where an output from the light sensor 14 is low and it is detected that it is dark around the liquid crystal display device 1, it is possible for the liquid crystal display device 1 to turn on the backlight 40 and to display information in the transmissive mode.

Furthermore, the liquid crystal display device 1 is capable of arranging an electronic device which prevents a decrease in intensity of light which enters the liquid crystal display device 1 so as to cause an increase in aperture ratio of the transmissive region. Moreover, the liquid crystal display device 1 is capable of arranging an electronic device which allows an accurate determination of coordinates on which an intensity of the light which enters the liquid crystal display device 1 has changed. It is preferable that the liquid crystal display device 1 be applied particularly to an electronic device such as a touch panel, a scanner, a camera, and a fingerprint sensor.

[Additional Description]

The liquid crystal display device 1 in accordance with the present embodiment may be arranged such that: the opening 22a is provided on the color filter 22 of any one of the pixel 3R, the pixel 3B, and the pixel 3G, and the light receiving section 14a of the light sensor 14 is provided in a region of the first substrate 10 which region faces the opening 22a.

Figure 4:
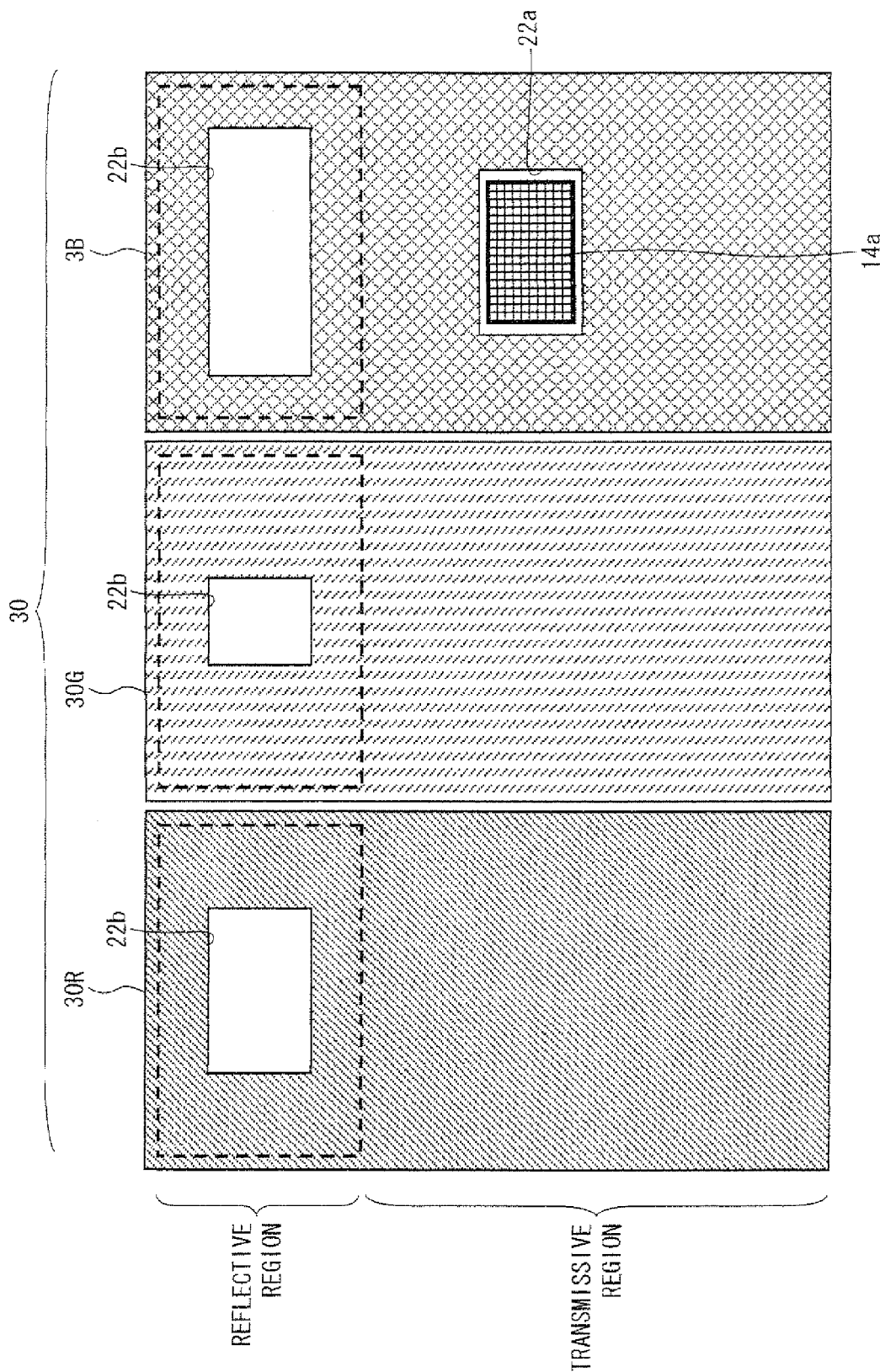
FIG. 4 is a plan view illustrating an arrangement of a feature of a picture element of a liquid crystal display device in accordance with an alternative embodiment of the present invention.

FIG. 4 is a schematic plan view illustrating a picture element 30 of a liquid crystal display device 1 in accordance with the present embodiment.

The picture element 30 (see FIG. 4) is different from the picture element 3 illustrated (see FIG. 2) in that an opening 22a and a light sensor 14 are provided only in a pixel 3B in which a blue color filter is provided.

The picture element 30 includes a pixel 30R in which a red color filter is provided, the pixel 3B, and a pixel 30G in which a green color filter is provided (see FIG. 4). Respective openings 22b are provided in respective reflective regions of the pixel 30R and the pixel 30G. This causes the light sensor 14 provided in the pixel 3B to detect an intensity of light which enters the picture element 30. Providing a plurality of the picture elements 30 in a matrix pattern on the display screen 2 (see FIG. 3) causes an intensity of light which enters the display screen 2 to be detected per picture element.

Note that it is possible to provide the light sensor 14 and the opening 22b in the pixel 30R or the pixel 30G. However, it is particularly preferable that the light sensor 14 and the opening 22b be provided in the pixel 3B in which a blue color filter is provided.

This is because, among a pixel R, a pixel G, and a pixel B, the pixel B is generally the lowest in luminance per unit area and because the pixel B is less affected by a change in a white balance. An aperture ratio is more likely to decrease in the case where the opening 22a is provided in a color filter 22 than in a case where no opening 22a is provided on the color filter 22. For this reason, providing the opening 22a in the pixel 3B in which a blue color filter is provided makes it possible to minimize (i) a decrease in aperture ratio and (ii) a change in a white balance.

Note that it is only necessary that a single opening 22a and a single light sensor 14 be provided for a single picture element 30 in the liquid crystal display device 1 in accordance with the present embodiment. Namely, it is unnecessary that the opening 22a be provided on the color filter 22 of any one of the pixel 30R, the pixel 30O, and the pixel 3B. The opening 22a may be provided on a boundary of the color filters 22 which are adjacent to each other. As an alternative, the opening 22a may also be extended over all the color filters 22 each of which constitutes the pixel 30R, the pixel 30G, and the pixel 3B, respectively.

Providing a single light sensor 14 for a plurality of the color filters 22 each of which respectively constitutes the pixel 30R, the pixel 30G, and the pixel 3B allows light detection per picture element 30. For example, in a case where the light sensor 14 is used as means for obtaining coordinate information on the display screen 2, it is possible to obtain a standard resolution in which a minimum detection unit is a single picture element 30.

In this case, it is possible to increase an aperture ratio of a transmissive region entirely in a single picture element 30 at maximum since a single opening 22a and a single light sensor 14 are provided for the single picture element 30. Furthermore, in a case where the opening 22a is extended over the plurality of the color filters 22, it is possible (i) to cause the plurality of the color filters 22 to share a loss in aperture ratio and (ii) to design a color balance with higher accuracy.

Note that the liquid crystal display device 1 may be arranged to include no opening 22b and no transparent resin 23 though the present embodiment explains the liquid crystal display device 1 of the multi-gap structure in which the opening 22b is provided in the reflective region and the transparent resin 23 is provided in the reflective region.

Furthermore, the liquid crystal display device 1 may be arranged to include the transmissive region but not the reflective region though the liquid crystal display device 1 in accordance with the present embodiment is arranged to include the transmissive region and the reflective region.

Further, the liquid crystal display device 1 may be arranged to include the light sensor 14 and the color filter 22 which are provided in an identical substrate (such an arrangement is referred, to as CF on array) though the picture element 3 in accordance with the present embodiment is arranged to include the light sensor 14 which is provided on the first substrate 10 and the color filter 22 which is provided on the second substrate 20. This point is explained below with reference to FIG. 5.

Figure 5:
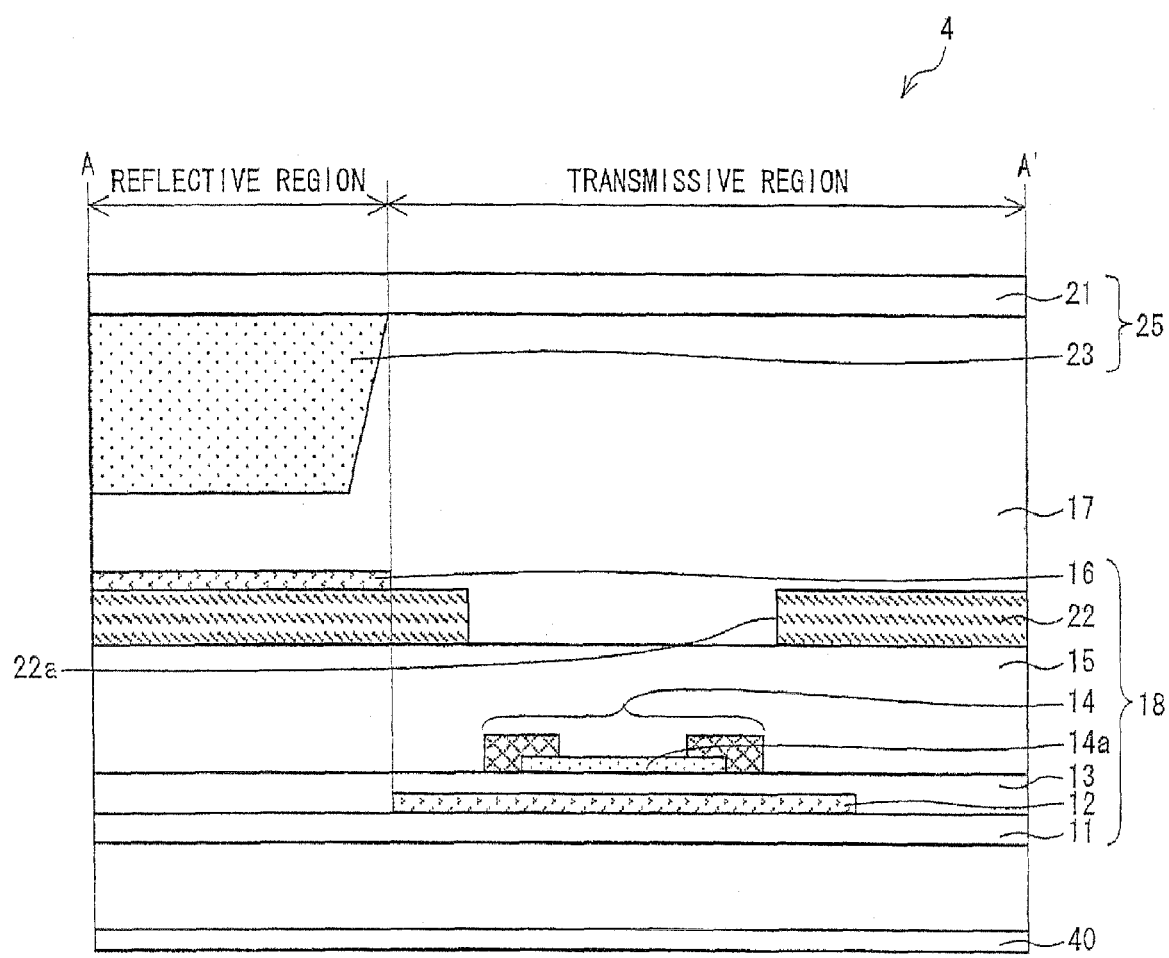
FIG. 5 is a cross-sectional view illustrating an arrangement of a feature of a picture element of a liquid crystal display device in accordance with an alternative embodiment of the present invention.
Figure 6:
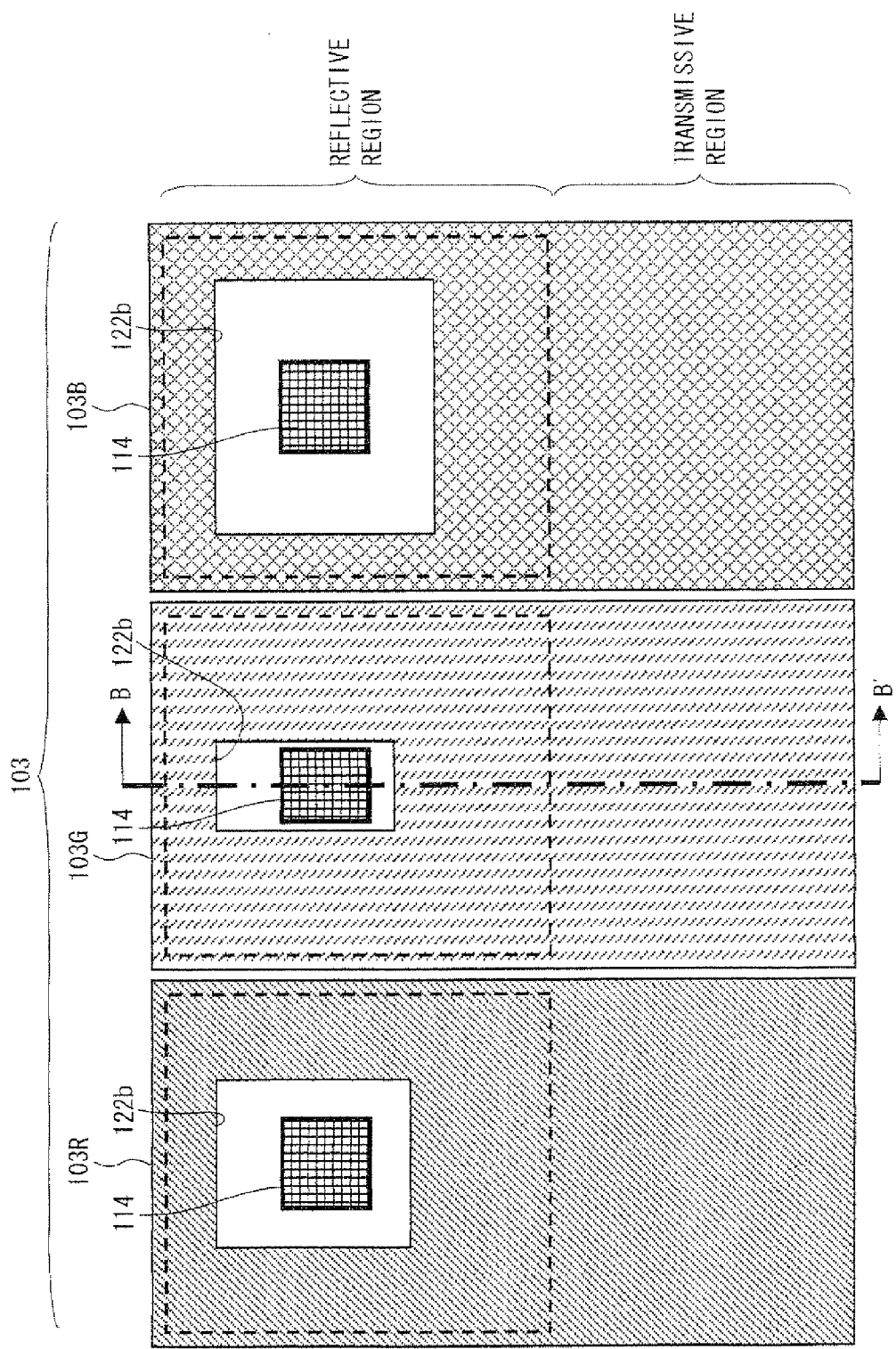
FIG. 6, which illustrates a prior art, is a plan view illustrating an arrangement of a feature of a picture element of a liquid crystal display device.
Figure 7:
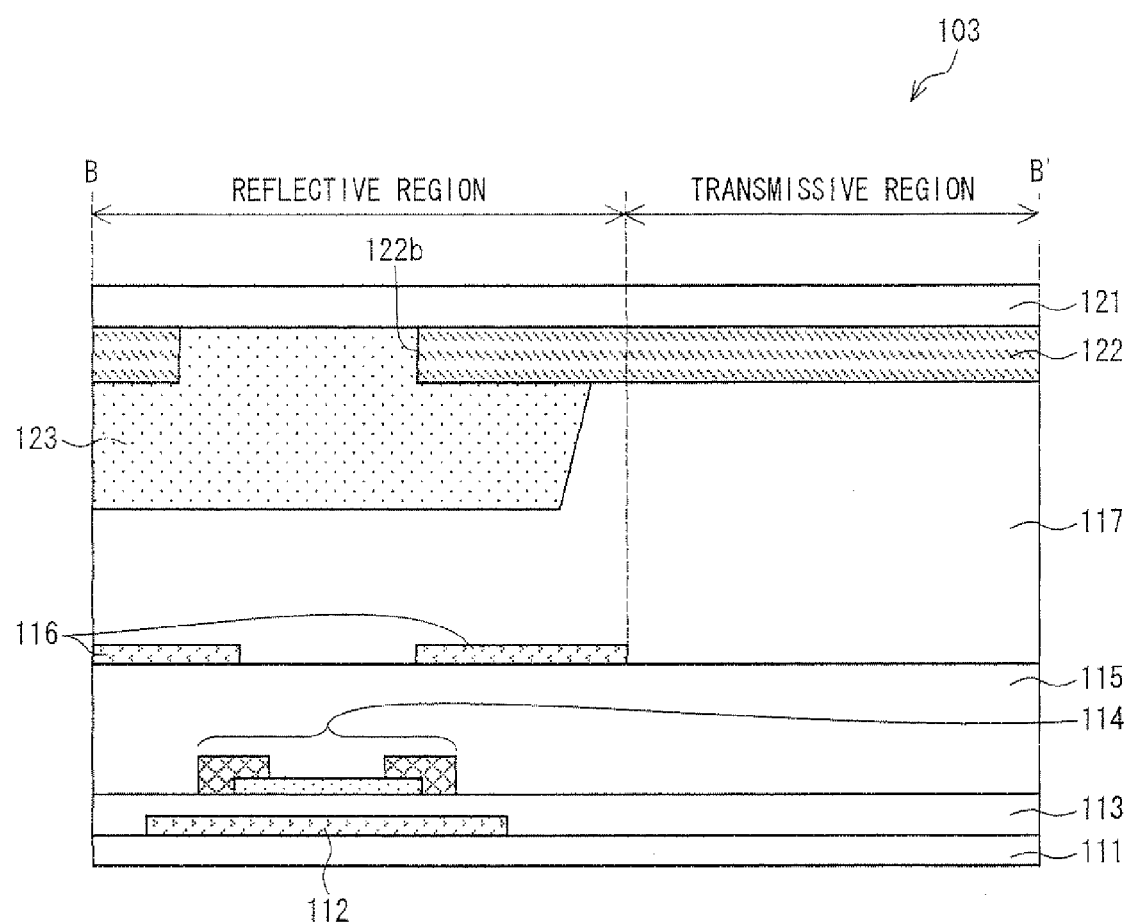
FIG. 7 is a cross-sectional view taken along the line B-B' of the liquid crystal display device illustrated in FIG. 6.

FIG. 5 is a cross-sectional view illustrating an arrangement of a picture element 4 in accordance with the present embodiment.

The picture element 4 includes a first substrate 18 and a second substrate 25 which are provided so as to face each other via a liquid crystal layer 17. Note that the first substrate 18 is different from the first substrate 10 (see FIG. 1) in that the first substrate 18 includes a color filter 22. Further, the second substrate 25 is different from the second substrate 20 (see FIG. 1) in that the second substrate 25 includes no color filter 22.

The color filter 22 of the first substrate 18 is provided on an organic insulating film 15. Furthermore, an opening 22a is provided right above a light receiving section 14a of a light sensor 14. Moreover, a reflective electrode 16 is provided on the color filter 22 in a reflective region. Further, a transparent electrode (not illustrated) is provided on the color filter 22 and the reflective electrode 16. Furthermore, a transparent resin 23 is provided in the reflective region of the second substrate 25. Explanation of an arrangement of members other than those above is omitted here due to redundancy since the arrangement is similar to that in the picture element 3 (see FIG. 1).

By forming both the light sensor 14 and the color filter 22 on the first substrate 18 (see FIG. 5), it is possible to provide the color filter 22 on the first substrate 18 without being affected by displacement caused when the first substrate 18 and the second substrate 25 are combined together. Note that though variations are also caused in mask alignment in the photolithography for forming the opening 22a, the variations are fewer than variations caused when the first substrate 18 and the second substrate 25 are combined together.

Moreover, it is possible to cause a distance between the opening 22a and the light receiving section 14a of the light sensor 14 to be shorter in the case where the light sensor 14 and the color filter 22 are provided on the first substrate 18 than in a case where the color filter 22 is provided on a substrate 21. Therefore, it is possible to provide the opening 22a right above the light receiving section 14a of the light sensor 14 with higher accuracy in the case where the light sensor 14 and the color filter 22 are provided on the first substrate 18 than in the case where the color filter 22 is provided on the substrate 21. Because of this, an error made by displacement of the opening 22a and the light receiving section 14a of the light sensor 14 can be smaller, and it is therefore possible to reduce respective areas of the opening 22a and the light sensor 14. This further prevents the decrease in aperture ratio of the transmissive region.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

In order to solve the problems, a liquid crystal display device in accordance with the present invention includes: dot regions in each of which a color filter layer is provided; and a transmissive region included in each of the dot regions, for causing information to be displayed by causing light emitted from a light source to be transmitted through the transmissive region, the liquid crystal display device including: a first region provided on the color filter layer in the transmissive region, the first region being a region whose transmittance is higher than a transmittance of a color layer; and a light detection element provided in the transmissive region, for detecting an intensity of light which enters the light detection element, the light directly entering the light detection element through the first region.

According to the arrangement, external light emitted toward the liquid crystal display device directly enters the light detection element through the first region. Namely, the light which enters the light detection element directly enters the light detection element without being transmitted through the color filter layer. This makes it possible to avoid a situation where the light which enters the light detection element decreases in intensity by being transmitted through the color filter. That is, it is possible to prevent a decrease in light receiving sensitivity of the light detection element. Therefore, it is possible to cause an area of the light detection element to be smaller in the case where the first region is provided on the color filter layer than in a case where no first region is provided on the color filter layer. This realizes a liquid crystal display device which includes a light detection element and which prevents a decrease in aperture ratio of a transmissive region.

It is desirable that the first region which is the region whose transmittance is higher than a transmittance of the color layer be transmissive for light of a wavelength range from 400 nm to 700 nm, with a transmittance of preferably not less than 80% and more preferably not less than 90% throughout the first region.

As described earlier, a higher transmittance of the first region allows a further reduction in an area of the light detection element. Moreover, a transmittance of the first region varies relative to a given visible light wavelength. In a case where the first region is colored, the coloring is superposed on a reflective display and a color of the reflective display is spoiled. For this reason, it is desirable that the first region be transmissive for light of the wavelength range from 400 nm to 700 nm which is a visible light wavelength range, with a generally high transmittance.

External light emitted toward a liquid crystal display device at least includes (1) ambient light obtained in an environment in which the liquid crystal display device is provided (i.e., sunlight, illuminating light, and the like) and) light emitted from a light source which is built in the liquid crystal display device, the light being reflected in a document which is provided near a color filter layer and whose information is to be scanned.

It is preferable that the liquid crystal display device in accordance with the present invention further include: a first substrate, a second substrate, and a liquid crystal layer in such a manner that the first substrate and the second substrate face each other via the liquid crystal layer, the light detection element being provided on the first substrate, the color filter layer being provided on the second substrate, the first region being provided on the color filter layer so as to face a light receiving section of the light detection element.

According to the arrangement, light around the second substrate (external light) securely enters the light receiving section of the light detection element through the first region. This allows a secure detection of an intensity of external light which passes through the second substrate. It is only necessary that the first region be provided on the color filter layer so as to face at least the light receiving section of the light detection element. This allows the first region to have an area of necessity minimum.

Further, it is possible to separately form the light detection element and the color filter layer by providing the light detection element and the colored layer on the first substrate and the second substrate, respectively. This allows a reduction in time required for producing the liquid crystal display device in accordance with the present invention.

It is preferable that the liquid crystal display device in accordance with the present invention further include: a first substrate, a second substrate, and a liquid crystal layer in such a manner that the first substrate and the second substrate face each other via the liquid crystal layer, the light detection element and the color filter layer, each being provided on the first substrate, the color filter layer being provided above the light detection element, the first region being provided on the color filter layer so as to be right above a light receiving section of the light detection element.

By forming both the light detection element and the color filter layer on an identical substrate in accordance with the arrangement, it is possible to provide the color filter layer on the first substrate without being affected by displacement caused when the first substrate and the second substrate are combined together. Furthermore, it is possible to cause a distance between the first region and light detection element to be shorter in the case where the light detection element and the color filter layer are provided in an identical substrate than in a case where the color filter layer is provided on the second substrate.

Therefore, it is possible to provide the first region right above the light receiving section of the light detection element with higher accuracy in the case where the light detection element and the color filter layer are provided in an identical substrate than in the case where the color filter layer is provided on the second substrate. Because of this, an error made by displacement of the first region and the light receiving section of the light detection element can be smaller, and it is therefore possible to reduce respective areas of the first region and the light detection element. This further prevents the decrease in aperture ratio of the transmissive region.

It is preferable that the liquid crystal display device in accordance with the present invention further include a plurality of circuit elements arranged in the light detection element, the plurality of circuit elements having respective gaps therebetween.

According to the arrangement, the light detection element includes the plurality of circuit elements (not illustrated) such as a diode, a transistor, a capacitor, and the like, and the plurality of circuit elements have respective gaps therebetween. This allows the light detection element to cause light to be transmitted through the respective gaps provided between the plurality of circuit elements such as a diode, a transistor, a capacitor, and the like. For this reason, providing the light detection element in the transmissive region causes light emitted from the light source to be transmitted through the respective gaps. Therefore, it is possible to further prevent a decrease in aperture ratio of the transmissive region.

For example, in the case where a reflective region is provided in each of the dot regions and the light detection element is provided in the reflective region, the reflective region becomes larger in area than in a case where no light detection element is provided in each of the dot regions. This is because it is necessary to secure, in each of the dot regions, a reflective region whose area is large enough to allocate at least the light detection element therein. Moreover, in a case where a pixel drive element (switching element) is provided in the reflective region, a gap is made between the light detection element and the switching element. For this reason, it is necessary to secure a reflective region whose area is large enough to allocate therein at least the gap thus made and the light detection element. This causes the reflective region to be larger. As a result, the transmissive region becomes smaller. This causes a loss in aperture ratio of the transmissive region.

On the other hand, in the case where the light detection element is provided in the transmissive region, an aperture ratio of the transmissive region is reduced as much as an area which is occupied by the light detection element exclusive of the respective gaps, as compared with the case where no light detection element is provided in each of the dot regions. This is because the respective gaps between the plurality of circuit elements which are included in the light detection element contribute as the transmissive region.

Accordingly, it is possible to further prevent a decrease in aperture ratio of the transmissive region in the case where the light detection element provided in the transmissive region than in the case where the light detection element is provided in the reflective region.

It is preferable that the liquid crystal display device in accordance with the present invention further include: a light source provided above an outer side of the first substrate; and a light blocking layer provided between the light source and the light detection element, for blocking light emitted from the light source, the light blocking layer being provided so as to face the first region via the light detection element.

This makes it possible to prevent the light emitted from the light source from entering the light detection element. This allows the light detection element to accurately detect an intensity of external light which enters the light detection element from above the second substrate, without being affected by the light emitted from the light source.

Note here that providing the first region causes the colored layer to be unleveled. Such unleveled color filter disturbs alignment of liquid crystal molecules in the liquid crystal layer. Therefore, a display quality may deteriorate in a case where information is displayed by causing light to be transmitted through the colored layer. However, by providing the light blocking layer in accordance with the arrangement so that the light blocking layer faces the first region via the light detection element, it is possible to block the light emitted from the light source so as not to cause the light emitted from the light source to pass through a region in which the first region is provided. This makes it possible to prevent the disturbance in the alignment due to the first region from being visible, and to prevent a decrease in contrast from being visible. Further, it is unnecessary to provide, in the first region, a film for leveling the colored layer off.

It is preferable that the liquid crystal display device in accordance with the present invention further include: a reflective region included in each of the dot regions, for causing information to be displayed by causing light to be reflected on a reflective plate provided in the reflective region.

When the external light enters each of the dot regions through the color filter layer, the light which enters each of the dot regions is reflected on the reflective plate in accordance with the arrangement. For this reason, when it is bright in an environment where a liquid crystal display device is provided, it is possible to employ a reflective mode which causes a liquid crystal display device to display a still image, a moving picture, a letter, or the like (hereinafter abbreviated as an "image" or the like) by use of reflective light which is reflected on the reflective plate. This allows lower power consumption since no light source is necessary in the reflective mode.

It is possible to control, in accordance with an output from the light detection element, switching between (i) a transmissive mode in which information is displayed by causing light emitted from the light source to be transmitted through the transmissive region and (ii) the reflective mode in which ambient light is used. For example, when an output from the light detection element is high and the light detection element detects that it is bright around the liquid crystal display device, it is possible to cause information to be displayed in the reflective mode by turning off the light source. On the contrary, when an output from the light detection element is low and the light detection element detects that it is dark around the liquid crystal display device, it is possible to cause information to be displayed in the transmissive mode by turning on the light source.

According to the arrangement, the liquid crystal display device includes the transmissive region and the reflective region, the liquid crystal display device including the light detection element provided in the transmissive region. Therefore, it is possible to cause an area of the reflective region to be smaller in such a case where the light detection element is provided in the transmissive region than in the case where the light detection element is provided in the reflective region. Namely, it is possible to increase an aperture ratio of the transmissive region. This is because it is possible to cause an area of the transmissive region to be larger in the case where the light detection element is provided in the transmissive region than in the case where the light detection element is provided in the reflective region.

Accordingly, in the case where the light detection element is provided in the transmissive region, it is possible to realize a liquid crystal display device including the light detection element which causes the liquid crystal display device to be more extensively practically used than in the case where the light detection element is provided in the reflective region.

The liquid crystal display device in accordance with the present invention is preferably arranged such that a plurality of the color filter layers through which light of different wavelengths is transmitted are arranged in each of the dot regions; each of the plurality of the color filter layers has the first region; and the light detection element is provided on the first substrate so as to face each first region of the plurality of the color filter layers, respectively.

According to the arrangement, each of the plurality of the color filter layers thus arranged has the first region and the light detection element. This causes an increase in number of the light detection elements to be provided in a single dot region, and it is therefore possible to increase a light detection sensitivity relative to the single dot region. Furthermore, it is possible to increase a resolution in a case where the dot regions are provided in a matrix pattern and the light detection element is used as means for obtaining coordinate information.

The liquid crystal display device in accordance with the present invention is preferably arranged such that: a plurality of the color filter layers through which light of different wavelengths is transmitted are arranged in each of the dot regions; the first region is provided in one of the plurality of the color filter layers in each dot region; and the light detection element is provided on the first substrate so as to face the first region.

According to the arrangement, the first region is provided in one of the plurality of the color filters thus arranged in each dot region. It is not always necessary that the first region be provided in any one of the plurality of the color filter layers. The first region may be provided on a boundary of the color filter layers which are adjacent to each other. As an alternative, the first region may also be extended over all the color filter layers of not less than three.

Providing a single light detection element for a plurality of the color filter layers allows light detection per dot region. For example, in a case where a light detection element is used as means for obtaining coordinate information, it is possible to obtain a standard resolution in which a minimum detection unit is a single dot.

It is possible to increase an aperture ratio of a transmissive region entirely in a single dot region at maximum since a single first region and a single light detection element are provided for the single dot region.

Furthermore, in a case where a first region is extended over a plurality of color filter layers, it is possible (i) to cause the plurality of color filter layers to share a loss in aperture ratio and (ii) to design a color balance with higher accuracy.

The liquid crystal display device in accordance with the present invention is preferably arranged such that: the plurality of the color filter layers through which light of different wavelengths is transmitted are: (i) a red color filter through which red light is transmitted, (ii) a green color filter through which green light is transmitted, and (iii) a blue color filter through which blue light is transmitted; and the first region is provided in the blue color filter.

Among red light, green light, and blue light, the blue light is generally the lowest in light intensity per unit area and the blue light is less affected by a change in a color balance (white balance). Therefore, providing the first region in a blue color filter makes it possible to prevent a decrease in intensity of light which enters the light sensor element by minimizing (i) a decrease in aperture ratio and (ii) a change in a white balance.

It is preferable that the liquid crystal display device in accordance with the present invention further include a second region provided on the color filter layer in the reflective region, the second region being another region whose transmittance is higher than the transmittance of the color layer. Note here that light emitted from the reflective region passes through the color filter layer two times: (i) when the external light enters the reflective region and (ii) when the external light which enters the reflective region is reflected on the reflective plate, thereafter being emitted from the reflective region. For this reason, the light emitted from the reflective region has a lower light intensity and a deeper color than light emitted from the transmissive region.

Therefore, according to the arrangement, it follows that the external light which enters the reflective region and is emitted from the reflective region passes through the second region. Therefore, in the case where the second region is provided on the color filter layer in the reflective region, it is possible to further prevent a decrease an intensity of the light which enters the reflective region and is emitted from the reflective region than in a case where no second region is provided on the color filter layer in the reflective region. Namely, it is possible (i) to increase a reflectance of the external light which enters the reflective region and (ii) to cause a color of the external light which is emitted from the reflective region to be close to a color of light which is emitted from the transmissive region.

In a case where (i) an arrangement in which a plurality of color filter layers through which light of different wavelengths is transmitted are arranged in each of the dot regions and (ii) an arrangement in which a reflective region is included in each of the dot regions are combined, it is preferable to provide a first region in the reflective region in each of the plurality of color filter layers and to change an area of the first region in accordance with each of the plurality of color filter layers.

Because of this, a color balance of information displayed in a reflective mode can be adjusted in accordance with whether an area of the first region is large or small.

It is preferable that the liquid crystal display device in accordance with the present invention further include: a display region in which the dot regions are provided in a matrix pattern.

This makes it possible to provide a liquid crystal display device which includes at least a transmissive region out of the transmissive region and a reflective region so as to display information in a transmissive mode, the liquid crystal display device including a light detection element provided in the transmissive region of each of the dot regions.

It is possible to cause the light detection element in accordance with the arrangement to function as means for obtaining coordinate information on the display region. For example, the light detection element is capable of detecting that an operator brings a finger or a stylus close to somewhere on the display region. Furthermore, when a document whose information is to be scanned is put on the display region and light emitted from the light source is directed toward the document, it is possible to scan information of the document and to display the scanned information on the display region by detection of light reflected in the document by the light detection element.

The light detection element is provided so as to correspond to a non-colored region provided on the color filter layer in the transmissive region as described earlier. This prevents a decrease in aperture ratio of the transmissive region. Accordingly, it is possible to provide a liquid crystal display device which is capable of brightly displaying information in the transmissive mode and which has a touch panel function, or a liquid crystal display device which is capable of brightly displaying information in the transmissive mode and which has a scanner function.

Moreover, it is possible to add, to the liquid crystal display device, a function of displaying information in the reflective mode by providing the reflective region in each of the dot regions.

It is preferable that an electronic device in accordance with the present invention include a liquid crystal display device as mentioned above. This makes it possible to arrange an electronic device including a liquid crystal display device which includes a light detection element whose minimum detection unit is a single dot and which prevents a decrease in aperture ratio of a transmissive region.

As described earlier, a liquid crystal display device in accordance with the present invention includes: dot regions in each of which a color filter layer is provided; and a transmissive region included in each of the dot regions, for causing light to be transmitted through the transmissive region, the liquid crystal display device including: a first region provided on the color filter layer in the transmissive region, the first region being a region whose transmittance is higher than a transmittance of a color layer; and a light detection element provided in the transmissive region, for detecting an intensity of light which enters the light detection element, the light directly entering the light detection element through the first region.

This brings about an effect that it is possible to realize a liquid crystal display device which includes a light detection element whose minimum detection unit is a single dot and which prevents a decrease in aperture ratio of a transmissive region.

In order to solve the problems, a liquid crystal display device in accordance with the present invention includes: dot regions in each of which a color filter layer is provided; and a transmissive region included in each of the dot regions, for causing information to be displayed by causing light emitted from a light source to be transmitted through the transmissive region, the liquid crystal display device including: a non-colored region provided on the color filter layer in the transmissive region, the non-colored region being a region whose transmittance is higher than a transmittance of a color layer; and a light detection element provided in the transmissive region, for detecting an intensity of light which enters the light detection element, the light directly entering the light detection element through the non-colored region.

According to the arrangement, external light emitted toward the liquid crystal display device directly enters the light detection element through the non-colored region. Namely, the light which enters the light detection element directly enters the light detection element without being transmitted through the color filter layer. This makes it possible to avoid a situation where the light which enters the light detection element decreases in intensity by being transmitted through the color filter. That is, it is possible to prevent a decrease in light receiving sensitivity of the light detection element. Therefore, it is possible to cause an area of the light detection element to be smaller in the case where the non-colored region is provided on the color filter layer than in a case where no non-colored region is provided on the color filter layer. This realizes a liquid crystal display device which includes a light detection element and which prevents a decrease in aperture ratio of a transmissive region.

External light emitted toward a liquid crystal display device at least includes (i) ambient light obtained in an environment in which the liquid crystal display device is provided (i.e., sunlight, illuminating light, and the like) and (ii) light emitted from a light source which is built in the liquid crystal display device, the light being reflected in a document which is provided near a color filter layer and whose information is to be scanned.

It is preferable that the liquid crystal display device in accordance with the present invention further include: a first substrate, a second substrate, and a liquid crystal layer in such a manner that the first substrate and the second substrate face each other via the liquid crystal layer, the light detection element being provided on the first substrate, the color filter layer being provided on the second substrate, the non-colored region being provided on the color filter layer so as to face a light receiving section of the light detection element.

According to the arrangement, light around the second substrate (external light) securely enters the light receiving section of the light detection element through the non-colored region. This allows a secure detection of an intensity of external light which passes through the second substrate. It is only necessary that the non-colored region be provided on the color filter layer so as to face at least the light receiving section of the light detection element. This allows the non-colored region to have an area of necessity minimum.

Further, it is possible to separately form the light detection element and the color filter layer by providing the light detection element and the colored layer on the first substrate and the second substrate, respectively. This allows a reduction in time required for producing the liquid crystal display device in accordance with the present invention.

It is preferable that the liquid crystal display device in accordance with the present invention further include: a first substrate, a second substrate, and a liquid crystal layer in such a manner that the first substrate and the second substrate face each other via the liquid crystal layer, the light detection element and the color filter layer, each being provided on the first substrate, the color filter layer being provided above the light detection element, the non-colored region being provided on the color filter layer so as to be right above a light receiving section of the light detection element.

By forming both the light detection element and the color filter layer on an identical substrate in accordance with the arrangement, it is possible to provide the color filter layer on the first substrate without being affected by displacement caused when the first substrate and the second substrate are combined together. Furthermore, it is possible to cause a distance between the non-colored region and light detection element to be shorter in the case where the light detection element and the color filter layer are provided in an identical substrate than in a case where the color filter layer is provided on the second substrate. Therefore, it is possible to provide the non-colored region right above the light receiving section of the light detection element with higher accuracy in the case where the light detection element and the color filter layer are provided in an identical substrate than in the case where the color filter layer is provided on the second substrate. Because of this, an error made by displacement of the non-colored region and the light receiving section of the light detection element can be smaller, and it is therefore possible to reduce respective areas of the non-colored region and the light detection element. This further prevents the decrease in aperture ratio of the transmissive region.

It is preferable that the liquid crystal display device in accordance with the present invention further include a plurality of circuit elements arranged in the light detection element, the plurality of circuit elements having respective gaps therebetween.

According to the arrangement, the light detection element includes the plurality of circuit elements (not illustrated) such as a diode, a transistor, a capacitor, and the like, and the plurality of circuit elements have respective gaps therebetween. This allows the light detection element to cause light to be transmitted through the respective gaps provided between the plurality of circuit elements such as a diode, a transistor, a capacitor, and the like. For this reason, providing the light detection element in the transmissive region causes light emitted from the light source to be transmitted through the respective gaps. Therefore, it is possible to further prevent a decrease in aperture ratio of the transmissive region.

For example, in the case where a reflective region is provided in each of the dot regions and the light detection element is provided in the reflective region, the reflective region becomes larger in area than in a case where no light detection element is provided in each of the dot regions. This is because it is necessary to secure, in each of the dot regions, a reflective region whose area is large enough to allocate at least the light detection element therein. Moreover, in a case where a pixel drive element (switching element) is provided in the reflective region, a gap is made between the light detection element and the switching element. For this reason, it is necessary to secure a reflective region whose area is large enough to allocate therein at least the gap thus made and the light detection element. This causes the reflective region to be larger. As a result, the transmissive region becomes smaller. This causes a loss in aperture ratio of the transmissive region.

On the other hand, in the case where the light detection element is provided in the transmissive region, an aperture ratio of the transmissive region is reduced as much as an area which is occupied by the light detection element exclusive of the respective gaps, as compared with the case where no light detection element is provided in each of the dot regions. This is because the respective gaps between the plurality of circuit elements which are included in the light detection element contribute as the transmissive region.

Accordingly, it is possible to further prevent a decrease in aperture ratio of the transmissive region in the case where the light detection element provided in the transmissive region than in the case where the light detection element is provided in the reflective region.

It is preferable that the liquid crystal display device in accordance with the present invention further include: a light source provided above an outer side of the first substrate; and a light blocking layer provided between the light source and the light detection element, for blocking light emitted from the light source, the light blocking layer being provided so as to face the non-colored region via the light detection element.

This makes it possible to prevent the light emitted from the light source from entering the light detection element. This allows the light detection element to accurately detect an intensity of external light which enters the light detection element from above the second, substrate, without being affected by the light emitted from the light source.

Note here that providing the non-colored region causes the colored layer to be unleveled. Such unleveled color filter disturbs alignment of liquid crystal molecules in the liquid crystal layer. Therefore, a display quality may deteriorate in a case where information is displayed by causing light to be transmitted through the colored layer. However, by providing the light blocking layer in accordance with the arrangement so that the light blocking layer faces the non-colored region via the light detection element, it is possible to block the light emitted from the light source so as not to cause the light emitted from the light source to pass through a region in which the non-colored region is provided. This makes it possible to prevent the disturbance in the alignment due to the non-colored region from being visible, and to prevent a decrease in contrast from being visible. Further, it is unnecessary to provide, in the non-colored region, a film for leveling the colored layer off.

It is preferable that the liquid crystal display device in accordance with the present invention further include: a reflective region included in each of the dot regions, for causing information to be displayed by causing light to be reflected on a reflective plate provided in the reflective region.

When the external light enters each of the dot regions through the color filter layer, the light which enters each of the dot regions is reflected on the reflective plate in accordance with the arrangement. For this reason, when it is bright in an environment where a liquid crystal display device is provided, it is possible to employ a reflective mode which causes a liquid crystal display device to display a still image, a moving picture, a letter, or the like (hereinafter abbreviated as an "image" or the like) by use of reflective light which is reflected on the reflective plate. This allows lower power consumption since no light source is necessary in the reflective mode.

It is possible to control, in accordance with an output from the light detection element, switching between (i) a transmissive mode in which information is displayed by causing light emitted from the light source to be transmitted through the transmissive region and (ii) the reflective mode in which ambient light is used. For example, when an output from the light detection element is high and the light detection element detects that it is bright around the liquid crystal display device, it is possible to cause information to be displayed in the reflective mode by turning off the light source. On the contrary, when an output from the light detection element is low and the light detection element detects that it is dark around the liquid crystal display device, it is possible to cause information to be displayed in the transmissive mode by turning on the light source.

According to the arrangement, the liquid crystal display device includes the transmissive region and the reflective region, the liquid crystal display device including the light detection element provided in the transmissive region. Therefore, it is possible to cause an area of the reflective region to be smaller in such a case where the light detection element is provided in the transmissive region than in the case where the light detection element is provided in the reflective region. Namely, it is possible to increase an aperture ratio of the transmissive region. This is because it is possible to cause an area of the transmissive region to be larger in the case where the light detection element is provided in the transmissive region than in the case where the light detection element is provided in the reflective region.

Accordingly, in the case where the light detection element is provided in the transmissive region, it is possible to realize a liquid crystal display device including the light detection element which causes the liquid crystal display device to be more extensively practically used than in the case where the light detection element is provided in the reflective region.

The liquid crystal display device in accordance with the present invention is preferably arranged such that: a plurality of the color filter layers through which light of different wavelengths is transmitted are arranged in each of the dot regions; each of the plurality of the color filter layers has the non-colored region; and the light detection element is provided on the first substrate so as to face each non-colored region of the plurality of the color filter layers, respectively.

According to the arrangement, each of the plurality of the color filter layers thus arranged has the non-colored region and the light detection element. This causes an increase in number of the light detection elements to be provided in a single dot region, and it is therefore possible to increase a light detection sensitivity relative to the single dot region. Furthermore, it is possible to increase a resolution in a case where the dot regions are provided in a matrix pattern and the light detection element is used as means for obtaining coordinate information.

The liquid crystal display device in accordance with the present invention is preferably arranged such that: a plurality of the color filter layers through which light of different wavelengths is transmitted are arranged in each of the dot regions; the non-colored region is provided in one of the plurality of the color filter layers in each dot region; and the light detection element is provided on the first substrate so as to face the non-colored region.

According to the arrangement, the non-colored region is provided in one of the plurality of the color filters thus arranged in each dot region. It is not always necessary that the non-colored region be provided in any one of the plurality of the color filter layers. The non-colored region may be provided on a boundary of the color filter layers which are adjacent to each other. As an alternative, the non-colored region may also be extended over all the color filter layers of not less than three.

Providing a single light detection element for a plurality of the color filter layers allows light detection per dot region. For example, in a case where a light detection element is used as means for obtaining coordinate information, it is possible to obtain a standard resolution in which a minimum detection unit is a single dot.

It is possible to increase an aperture ratio of a transmissive region entirely in a single dot region at necessity maximum since a single non-colored region and a single light detection element are provided for the single dot region.

Furthermore, in a case where a non-colored region is extended over a plurality of color filter layers, it is possible (i) to cause the plurality of color filter layers to share a loss in aperture ratio and (ii) to design a color balance with higher accuracy.

The liquid crystal display device in accordance with the present invention is preferably arranged such that: the plurality of the color filter layers through which light of different wavelengths is transmitted are: (i) a red color filter through which red light is transmitted, (ii) a green color filter through which green light is transmitted, and (iii) a blue color filter through which blue light is transmitted; and the non-colored region is provided in the blue color filter.

Among red light, green light, and blue light, the blue light is generally the lowest in light intensity per unit area and the blue light is less affected by a change in a color balance (white balance). Therefore, providing the non-colored region in a blue color filter makes it possible to prevent a decrease in intensity of light which enters the light sensor element by minimizing (i) a decrease in aperture ratio and (ii) a change in a white balance.

It is preferable that the liquid crystal display device in accordance with the present invention further include another non-colored region provided on the color filter layer in the reflective region. Note here that light emitted from the reflective region passes through the color filter layer two times: (i) when the external light enters the reflective region and (ii) when the external light which enters the reflective region is reflected on the reflective plate, thereafter being emitted from the reflective region. For this reason, the light emitted from the reflective region has a lower light intensity and a deeper color than light emitted from the transmissive region.

Therefore, according to the arrangement, it follows that the external light which enters the reflective region and is emitted from the reflective region passes through the another non-colored region. Therefore, in the case where the another non-colored region is provided on the color filter layer in the reflective region, it is possible to further prevent a decrease an intensity of the light which enters the reflective region and is emitted from the reflective region than in a case where no second region is provided on the color filter layer in the reflective region. Namely, it is possible (i) to increase a reflectance of the external light which enters the reflective region and (ii) to cause a color of the external light which is emitted from the reflective region to be close to a color of light which is emitted from the transmissive region.

In a case where (i) an arrangement in which a plurality of color filter layers through which light of different wavelengths is transmitted are arranged in each of the dot regions and (ii) an arrangement in which a reflective region is included in each of the dot regions are combined, it is preferable to provide a non-colored region in the reflective region in each of the plurality of color filter layers and to change an area of the non-colored region in accordance with each of the plurality of color filter layers.

Because of this, a color balance of information displayed in a reflective mode can be adjusted in accordance with whether an area of the non-colored region is large or small.

It is preferable that the liquid crystal display device in accordance with the present invention further include: a display region in which the dot regions are provided in a matrix pattern.

This makes it possible to provide a liquid crystal display device which includes at least a transmissive region out of the transmissive region and a reflective region so as to display information in a transmissive mode, the liquid crystal display device including a light detection element provided in the transmissive region of each of the dot regions.

It is possible to cause the light detection element in accordance with the arrangement to function as means for obtaining coordinate information on the display region. For example, the light detection element is capable of detecting that an operator brings a finger or a stylus close to somewhere on the display region. Furthermore, when a document whose information is to be scanned is put on the display region and light emitted from the light source is directed toward the document, it is possible to scan information of the document and to display the scanned information on the display region by detection of light reflected in the document by the light detection element.

The light detection element is provided so as to correspond to a non-colored region provided on the color filter layer in the transmissive region as described earlier. This prevents a decrease in aperture ratio of the transmissive region. Accordingly, it is possible to provide a liquid crystal display device which is capable of brightly displaying information in the transmissive mode and which has a touch panel function, or a liquid crystal display device which is capable of brightly displaying information in the transmissive mode and which has a scanner function.

Moreover, it is possible to add, to the liquid crystal display device, a function of displaying information in the reflective mode by providing the reflective region in each of the dot regions.

It is preferable that an electronic device in accordance with the present invention include a liquid crystal display device as mentioned above. This makes it possible to arrange an electronic device including a liquid crystal display device which includes a light detection element whose minimum detection unit is a single dot and which prevents a decrease in aperture ratio of a transmissive region.

As described earlier, a liquid crystal display device in accordance with the present invention includes: dot regions in each of which a color filter layer is provided; and a transmissive region included in each of the dot regions, for causing light to be transmitted through the transmissive region, the liquid crystal display device including: a non-colored region provided on the color filter layer in the transmissive region; and a light detection element provided in the transmissive region, for detecting an intensity of light which enters the light detection element, the light directly entering the light detection element through the non-colored region.

This brings about an effect that it is possible to realize a liquid crystal display device which includes a light detection element whose minimum detection unit is a single dot and which prevents a decrease in aperture ratio of a transmissive region.

INDUSTRIAL APPLICABILITY

The invention is extensively applicable not only to a liquid crystal display device and a mobile electronic device (e.g., a PDA, a game machine, and the like) each of which has a touch panel function, but also to an electronic device which is required to accurately detect an intensity of light which enters the electronic device. This is because the present invention prevents a decrease in aperture ratio of a transmissive region, so as to prevent a decrease in intensity of light which enters the devices.

The invention claimed is:

1. A liquid crystal display device including:
   a plurality of dot regions in each of which a color filter layer is provided; and
   a transmissive region included in each of the dot regions, for causing information to be displayed by causing light emitted from a light source to be transmitted through the transmissive region,
   a reflective region defined by a reflective electrode and included in each of the dot regions, for causing information to be displayed by causing light to be reflected in the reflective region, so that each of the plurality of dot regions includes a transmissive region and a reflective region;
   wherein the color filter layer has a first region in the transmissive region, the first region being a region whose transmittance is higher than a transmittance of a color layer; and
   a light detection element provided in part of the transmissive region, for detecting an intensity of light which enters the light detection element,
   the light directly entering the light detection element through the first region.

2. The liquid crystal display device as set forth in claim 1, further comprising:
   a first substrate, a second substrate, and a liquid crystal layer in such a manner that the first substrate and the second substrate face each other via the liquid crystal layer,
      the light detection element being provided on the first substrate,
      the color filter layer being provided on the second substrate,
      the first region being provided on the color filter layer so as to face a light receiving section of the light detection element.

3. The liquid crystal display device as set forth in claim 2, wherein:
   a plurality of the color filter layers through which light of different wavelengths is transmitted are arranged in respective dot regions;
   each of the plurality of the color filter layers has the first region; and
   the light detection element is provided on the first substrate so as to face each first region of the plurality of the color filter layers, respectively.

4. The liquid crystal display device as set forth in claim 2, wherein:
   a plurality of the color filter layers through which light of different wavelengths is transmitted are arranged in each of the dot regions;
   the first region is provided in one of the plurality of the color filter layers in each dot region; and
   the light detection element is provided on the first substrate so as to face the first region.

5. The liquid crystal display device as set forth in claim 4, wherein:
   the plurality of the color filter layers through which light of different wavelengths is transmitted are: (i) a red color filter through which red light is transmitted, (ii) a green color filter through which green light is transmitted, and (iii) a blue color filter through which blue light is transmitted; and
   the first region is provided in the blue color filter.

6. The liquid crystal display device as set forth in claim 1, further comprising:
   a first substrate, a second substrate, and a liquid crystal layer in such a manner that the first substrate and the second substrate face each other via the liquid crystal layer, the light detection element and the color filter layer, each being provided on the first substrate, the color filter layer being provided above the light detection element, the first region being provided on the color filter layer so as to be right above a light receiving section of the light detection element.

7. The liquid crystal display device as set forth in claim 1, further comprising:

a plurality of circuit elements arranged in the light detection element, the plurality of circuit elements having respective gaps therebetween.

8. The liquid crystal display device as set forth in claim 1, further comprising: a light blocking layer for blocking light emitted from the light source from reaching the light detecting element, the light blocking layer being provided so as to face the first region via the light detection element.

9. The liquid crystal display device as set forth in claim 1, wherein the color filter layer has a second region in the reflective region, the second region being another region whose transmittance is higher than the transmittance of the color layer.

10. The liquid crystal display device as set forth in claim 1, further comprising: a display region in which the dot regions are provided in a matrix pattern.

11. An electronic device comprising a liquid crystal display device recited in claim 1.

* * * * *